United States Patent
Kamenoue

(10) Patent No.: US 10,214,162 B2
(45) Date of Patent: Feb. 26, 2019

(54) GROMMET

(71) Applicant: Yazaki Corporation, Tokyo (JP)

(72) Inventor: Masayoshi Kamenoue, Hiroshima (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 76 days.

(21) Appl. No.: 15/454,110

(22) Filed: Mar. 9, 2017

(65) Prior Publication Data

US 2017/0174155 A1   Jun. 22, 2017

Related U.S. Application Data

(63) Continuation of application No. PCT/JP2015/075609, filed on Sep. 9, 2015.

(30) Foreign Application Priority Data

Sep. 12, 2014 (JP) ................. 2014-185954

(51) Int. Cl.
*B60R 16/02* (2006.01)
*H02G 3/22* (2006.01)

(52) U.S. Cl.
CPC ........... *B60R 16/0222* (2013.01); *H02G 3/22* (2013.01)

(58) Field of Classification Search
CPC ......... H02G 3/22; F16L 5/10; B60R 16/0215; B60R 16/0222; B60R 16/02
USPC .......................................................... 16/2.2
See application file for complete search history.

(56) References Cited

U.S. PATENT DOCUMENTS

| | | | | |
|---|---|---|---|---|
| 5,806,139 A | * | 9/1998 | Anderson | B60R 16/0222 16/2.1 |
| 6,088,874 A | * | 7/2000 | Nakata | F16L 5/10 16/2.1 |
| 6,660,937 B1 | * | 12/2003 | MacLeod | B60R 16/0222 16/2.2 |
| 6,901,627 B2 | * | 6/2005 | Uchida | B60R 16/0222 16/2.1 |

(Continued)

FOREIGN PATENT DOCUMENTS

| | | |
|---|---|---|
| CN | 1505229 A | 6/2004 |
| CN | 102971465 A | 3/2013 |

(Continued)

OTHER PUBLICATIONS

International Search Report of PCT/JP2015/075609 dated Nov. 24, 2015 [PCT/ISA/210].

(Continued)

*Primary Examiner* — Roberta S Delisle
(74) *Attorney, Agent, or Firm* — Sughrue Mion, PLLC

(57) ABSTRACT

A grommet (1) provided with a body (9) with an annular shape which is to be mounted to a mounting member (3) and has a pair of opposing straight portion (5, 5) and a pair of arc portion (7, 7) which connect both ends of the pair of straight portions (5, 5), and a seal (11) which is continuously formed, in an elastically deformable manner, in the circumferential direction of the outer periphery side of the body (9) and is brought into close contact with a surface of the mounting member (3). The rigidity of the seal (11) is set so as to gradually increase from the side of the pair of straight portion (5, 5) toward the side of the pair of arc portion (7, 7).

6 Claims, 5 Drawing Sheets

(56) References Cited

U.S. PATENT DOCUMENTS

| | | | |
|---|---|---|---|
| 7,020,931 B1 * | 4/2006 | Burnett | B60R 16/0222 16/2.1 |
| 7,098,402 B2 * | 8/2006 | Suzuki | B60R 16/0222 16/2.1 |
| 7,423,223 B2 * | 9/2008 | Taira | B60S 1/48 16/2.1 |
| 7,481,436 B2 * | 1/2009 | May | F16L 5/10 16/2.2 |
| 7,614,915 B2 * | 11/2009 | Kamenoue | B60R 16/0222 439/623 |
| 7,943,854 B1 * | 5/2011 | Lipp | H02G 3/0468 16/2.1 |
| 8,420,943 B1 * | 4/2013 | La | B60R 16/0222 16/2.1 |
| 2003/0226234 A1 | 12/2003 | Katayama | |
| 2004/0107533 A1 | 6/2004 | Nishihara et al. | |
| 2012/0297573 A1 * | 11/2012 | Iwahara | F16L 5/10 16/2.2 |
| 2013/0061424 A1 | 3/2013 | Lee | |
| 2013/0199823 A1 | 8/2013 | Kanai (Popovici) | |

FOREIGN PATENT DOCUMENTS

| | | |
|---|---|---|
| CN | 103140383 A | 6/2013 |
| JP | 05-041029 U | 6/1993 |
| JP | 2003-319535 A | 11/2003 |
| JP | 2011-223747 A | 11/2011 |

OTHER PUBLICATIONS

Communication dated Nov. 3, 2017, from the State Intellectual Property Office of People's Republic of China in counterpart Application No. 201580049245.6.

* cited by examiner

GROMMET

CROSS REFERENCE TO RELATED APPLICATIONS

This application is a Continuation of PCT Application No. PCT/JP2015/075609, filed on Sep. 9, 2015, and claims the priority of Japanese Patent Application No. 2014-185954, filed on Sep. 12, 2014, the content of both of which is incorporated herein by reference.

BACKGROUND

Technical Field

The present invention relates to a grommet for use in a vehicle.

Related Art

A grommet is known in the art that includes an annular body that is mounted to a panel as a mounting member and has a pair of opposing straight portions and a pair of arc portions connecting both ends of the pair of straight portions; and a contact portion as a seal that is continuously formed to be elastically deformable, circumferentially on the outer peripheral side of the body, and is in sealing contact with the surface of the panel (see JP 2011-223747 A).

This grommet, in which the contact portion is elastically deformed and is brought into sealing contact with the surface of the panel by attaching the body to the panel, can prevent water or the like from entering through a mounting hole formed in the panel.

SUMMARY OF THE INVENTION

In a grommet disclosed in JP 2011-223747 A, a body is formed in an elliptical shape having a pair of straight portions and a pair of arc portions, and a seal formed with the body also has an elliptical shape, as with the body.

In such a grommet, a degree of elastic deformation on a straight portion side of the seal differs from that on an arc portion side with the seal being in sealing contact with the surface of a mounting member, and the degree of sealing of the seal against the surface of the mounting member becomes non-uniform, so that waterproofness provided by the seal is unstable over the entire circumferential area.

Accordingly, an object of the present invention is to provide a grommet capable of stabilizing the waterproofness provided by an elliptically shaped seal over the entire circumferential area.

The inventor found that, in an elliptically shaped seal, an arc portion side of the seal is more susceptible to elastic deformation compared to a straight portion side with the seal being in sealing contact with the surface of a mounting member, and the straight portion side of the seal elastically deforms toward the arc portion side of the seal. Accordingly, a grommet according to an aspect of the present invention is characterized by the following.

A grommet according to an aspect of the present invention includes a body with an annular shape having a pair of opposing straight portions and a pair of arc portions connecting both ends of the pair of straight portions, and the body configured to mount to a mounting member, and a seal formed continuously on the outer peripheral side of the body circumferentially and to be elastically deformable and is configured to be in sealing contact with a surface of the mounting member. Rigidity of the seal increase gradually from a side of the pair of straight portions toward a side of the pair of arc portions.

In this grommet, the seal is defined such its rigidity gradually increases from the side of the pair of straight portions toward the side of the pair of arc portions, so that the elastic deformation of the straight portion side of the seal toward the arc portion side of the seal can be reduced when the seal is in sealing contact with the surface of the mounting member.

Accordingly, for such a grommet, the straight portion side of the seal and the arc portion side of the seal can be uniformly and elastically deformed in the elliptically shaped seal, and thus waterproofness provided by the seal can be stabilized over the entire circumferential area.

A thickness on a body side of the seal may increase gradually from the side of the pair of straight portions toward the side of the pair of arc portions.

In this grommet, the thickness on the body side of the seal gradually increases from the side of the pair of straight portions toward the side of the pair of arc portions, so that the arc portion side of the seal is less susceptible to elastic deformation compared to the straight portion side, and thus the elastic deformation of the straight portion side of the seal toward the arc portion side can be reduced.

Additionally, in such a grommet, the degree of sealing over the entire circumferential area of the seal against the surface of the mounting member can be controlled by setting the thickness on the body side of the seal.

A deformable portion of the seal may be configured to deform elastically when in sealing contact with the surface of the mounting member, and the deformable portion may be gradually shortened from the side of the pair of straight portions toward the side of the pair of arc portions.

In this grommet, the deformable portion of the seal, which elastically deforms when in sealing contact with the surface of the mounting member, is gradually shortened from the side of the pair of straight portions toward the side of the pair of arc portions, so that the amount of deformation in the deformable portion on the arc portion side of the seal is less than that on the straight portion side, and thus the elastic deformation of the deformable portion on the straight portion side of the seal toward the arc portion side can be reduced.

Additionally, in such a grommet, the degree of sealing over the entire circumferential area of the seal against the surface of the mounting member can be controlled by setting the length of the deformable portion of the seal.

The aspect of the present invention provides a grommet capable of stabilizing the waterproofness provided by an elliptically shaped seal over the entire circumferential area.

DETAILED DESCRIPTION

Figure 1:
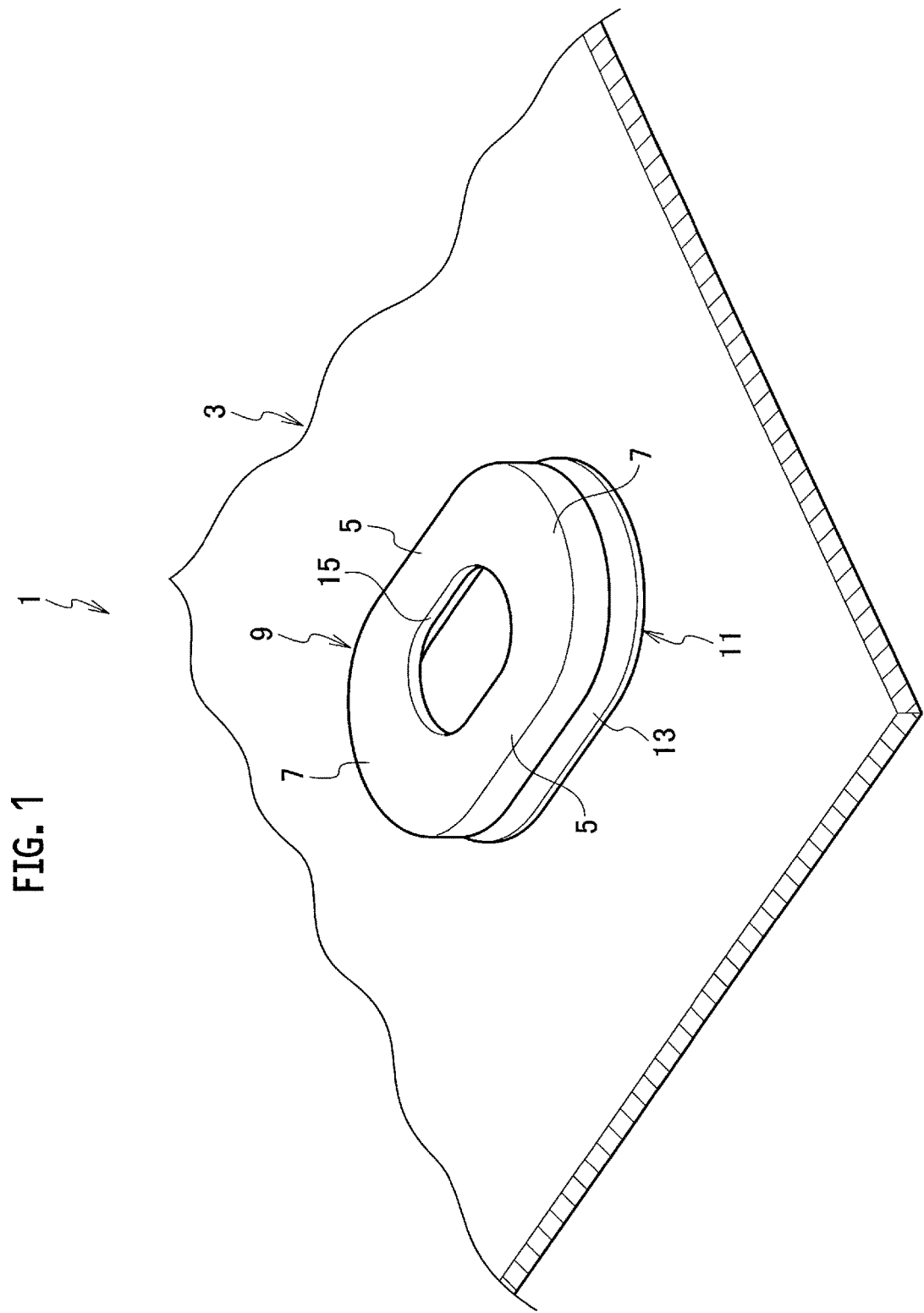
FIG. 1 is a perspective view of a grommet according to an embodiment of the present invention.
Figure 2:
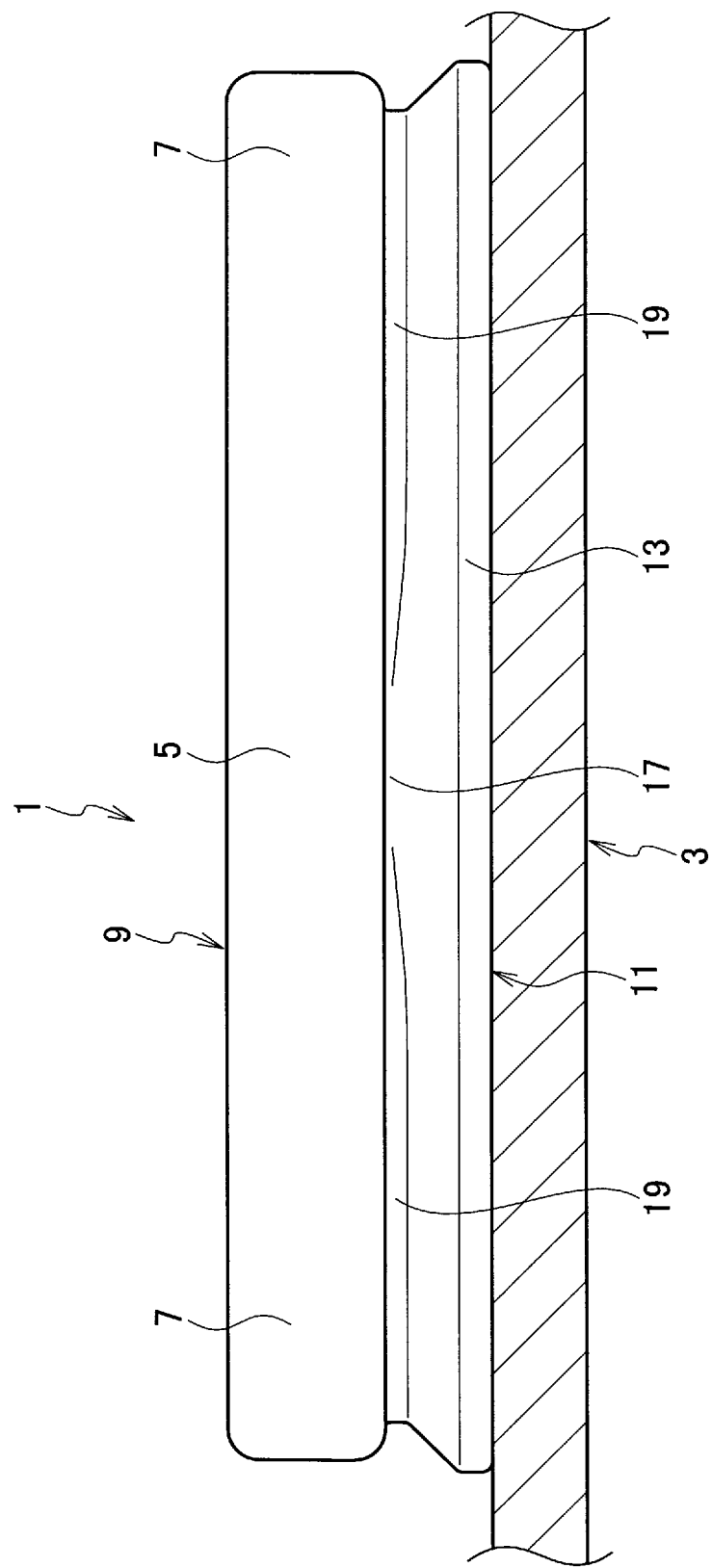
FIG. 2 is a front view of the grommet according to the embodiment of the present invention.
Figure 3:
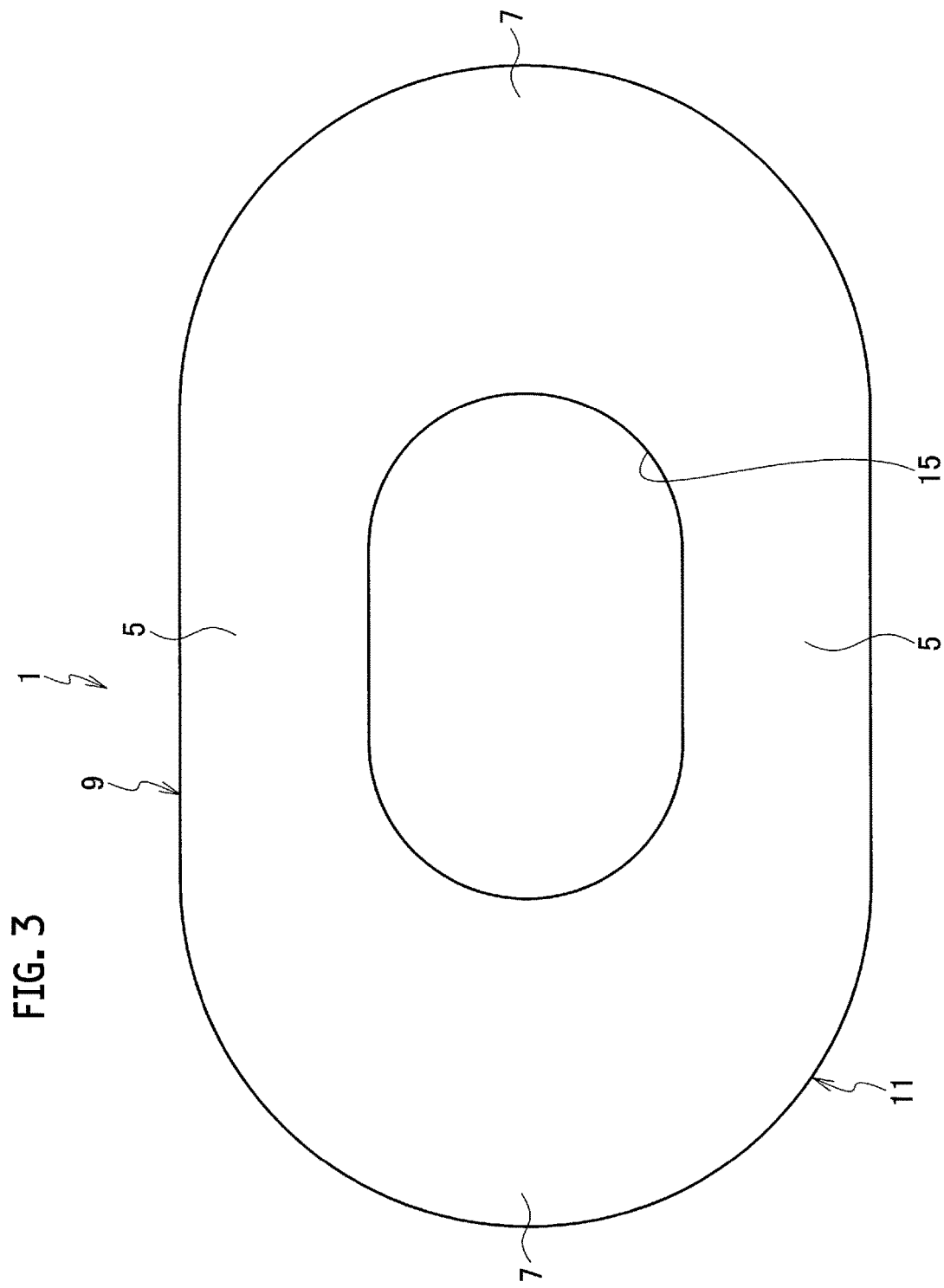
FIG. 3 is a top view of the grommet according to the embodiment of the present invention.
Figure 4A:
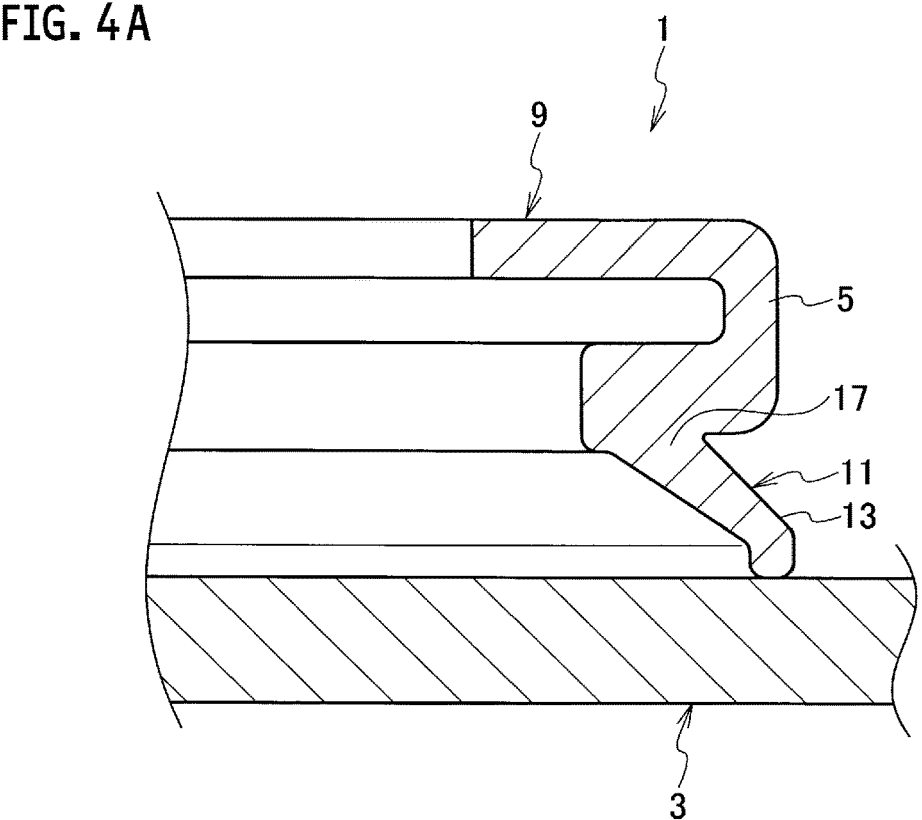
FIG. 4A is a cross-sectional view of a straight portion side of the grommet according to the embodiment of the present invention.
Figure 4B:
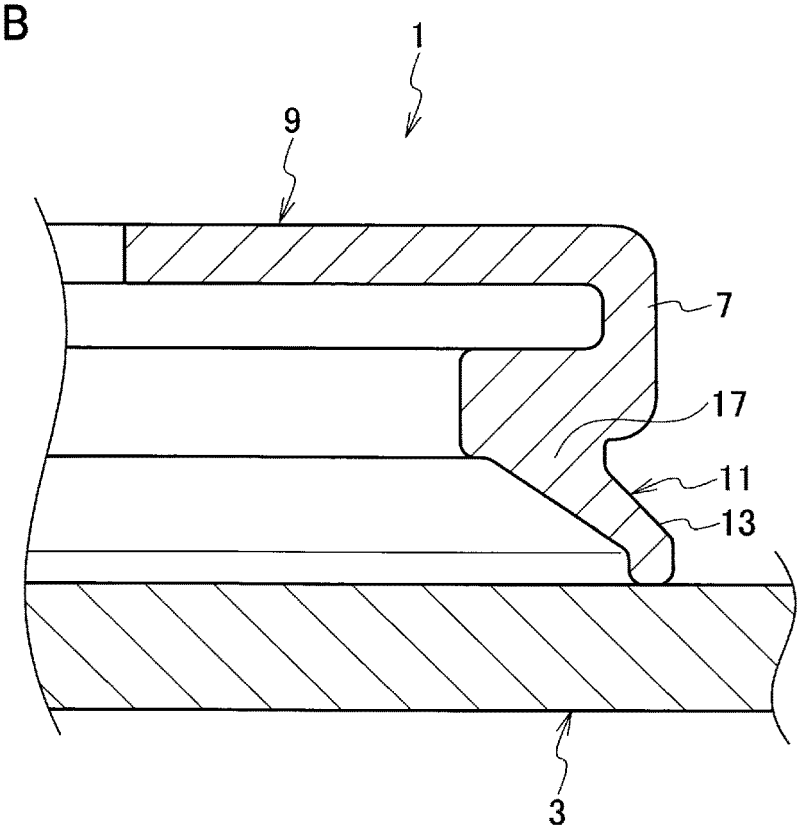
FIG. 4B is a cross-sectional view of an arc portion side of the grommet according to the embodiment of the present invention.

A grommet according to an embodiment of the present invention is described with reference to FIGS. 1 through 5B.

A grommet 1 according to the present embodiment includes an body 9 with an annular shape that is mounted to a mounting member 3 and has a pair of opposing straight portions 5, 5 and a pair of arc portions 7, 7 connecting both ends of the pair of straight portions 5, 5; and a seal 11 that is continuously formed to be elastically deformable, circumferentially on the outer peripheral side of the body 9, and is in sealing contact with the surface of the mounting member 3.

The seal 11 is defined such that its rigidity gradually increases from a side of the pair of straight portions 5, 5 toward a side of the pair of arc portions 7, 7.

The seal 11 is also defined such that the thickness on a body 9 side gradually increases from the side of the pair of straight portions 5, 5 toward the side of the pair of arc portions 7, 7.

Additionally, the seal 11 is defined such that a deformable portion 13, which elastically deforms when in sealing contact with the surface of the mounting member 3, is gradually shortened from the side of the pair of straight portions 5, 5 toward the side of the pair of arc portions 7, 7.

Here, the grommet 1 according to the present embodiment is inserted into an elliptical mounting hole (not shown) in the mounting member 3, such as, for example, a panel of a vehicle, and wires (not shown) to be wired across the mounting member 3 are inserted through a wire insertion portion 15 located in the center.

The grommet 1, in which the wires are inserted through the wire insertion portion 15, is mounted to the mounting hole of the mounting member 3 and separates one side of the mounting member 3 from the other to provide waterproofing. The grommet 1 according to the present embodiment will be described below in detail with reference to FIGS. 1 through 5B.

As illustrated in FIGS. 1 through 4B, the grommet 1 includes the body 9 and the seal 11.

The body 9 comprises an elastic material, such as rubber. The body 9 includes the pair of straight portions 5, 5 arranged opposite to each other and the pair of arc portions 7, 7 that are formed of a single member continuous with the pair of straight portions 5, 5 and are arranged opposite to each other so as to connect both ends of the pair of straight portions 5, 5. That is, the body 9 has an elliptical outer shape.

The body 9 is provided integrally with an inner member (not shown) having a lock engaged with an edge of the mounting member 3 therein, and the grommet 1 is secured to the mounting member 3 via the inner member. The outer periphery of the body 9 is provided with the seal 11.

The seal 11 is formed of a single member continuous with the body 9 over the entire circumferential area of the outer periphery of the body 9. The seal 11 includes a base 17 located on the body 9 side and a deformable portion 13 that is expanded and radially inclined from the base 17 and is elastically deformable.

With the body 9 being mounted to the mounting member 3, the deformable portion 13 elastically deforms from the base 17 and is pressed against and brought into sealing contact with the surface of the mounting member 3, and thus the seal 11 separates one side of the mounting member 3 from the other to provide waterproofing.

In a conventional grommet, the thickness of the base 17 of the seal 11 in the direction parallel to the surface of the mounting member 3 is uniform over the entire circumferential area. Since the thickness of the base 17 is uniform over the entire circumferential area, the length of the deformable portion 13 from the base 17 to the surface of the mounting member 3 is also uniform over the entire circumferential area.

As a result of verifying stress distribution when the seal 11 is pressed against the surface of the mounting member 3 in such a conventional grommet, it was confirmed that stress on a straight portion 5 side of the seal 11 is low and stress on an arc portion 7 side of the seal 11 is high.

The result of verifying the stress distribution in the seal 11 of such a conventional grommet indicates that the deformable portion 13 on the straight portion 5 side of the seal 11 is less susceptible to elastic deformation compared to the deformable portion 13 on the arc portion 7 side and the deformable portion 13 on the straight portion 5 side is pulled by the deformable portion 13 on the arc portion 7 side.

Therefore, in the conventional grommet, the contact pressure of the seal 11 on the surface of the mounting member 3 is not uniform over the entire circumferential area of the seal 11, and waterproofness provided by the seal 11 is unstable over the entire circumferential area.

In the grommet 1, the seal 11 is defined such that its rigidity gradually increases from the side of the pair of straight portions 5, 5 toward the side of the pair of arc portions 7, 7.

In particular, the outer periphery of the base 17 of the seal 11 is provided with a thickened portion 19 such that the thickness of the base 17 in the direction parallel to the surface of the mounting member 3 gradually increases from the straight portion 5 side toward the arc portion 7 side.

By providing such a thickened portion 19, the thickness on the body 9 side (i.e., of the base 17) of the seal 11 gradually increases from the side of the pair of straight portions 5, 5 toward the side of the pair of arc portions 7, 7, so that the rigidity on the straight portion 5 side decreases and the straight portion 5 side is more susceptible to elastic deformation.

Thus, since the thickened portion 19 is provided on the outer periphery of the base 17 of the seal 11, the thickened portion 19 can be provided after a grommet is molded by using a mold for molding a conventional grommet, and no new mold is needed.

A method for gradually increasing the thickness on the body 9 side (i.e., of the base 17) of the seal 11 from the side of the pair of straight portions 5, 5 toward the side of the pair of arc portions 7, 7 is not limited to the thickened portion 19 provided on the outer periphery of the base 17 of the seal 11. For example, a thinned portion may be provided so that the thickness of the base 17 in the direction parallel to the surface of the mounting member 3 gradually decreases from the arc portion 7 side toward the straight portion 5 side.

Thus, the deformable portion 13 of the seal 11 is defined such that the thickness of the base 17 gradually increases from the straight portion 5 side toward the arc portion 7 side, and a length from the base 17 to a distal end in sealing contact with the surface of the mounting member 3 gradually decreases from the straight portion 5 side toward the arc portion 7 side.

Therefore, the seal 11 is defined such that the deformable portion 13, which elastically deforms when in sealing contact with the surface of the mounting member 3, is gradually shortened from the side of the pair of straight portions 5, 5 toward the side of the pair of arc portions 7, 7, so that the amount of deformation on the arc portion 7 side of the deformable portion 13 decreases.

As a result of verifying stress distribution when the seal 11 is pressed against the surface of the mounting member 3 in the grommet 1 where the base 17 and the deformable portion 13 of the seal 11 are formed in such a manner, the deformable portion 13 on the straight portion 5 side is more susceptible to elastic deformation. This indicates that the deformable portion 13 on the straight portion 5 side is less pulled by the deformable portion 13 on the arc portion 7 side.

Therefore, in such a grommet 1, the contact pressure of the seal 11 on the surface of the mounting member 3 is equalized over the entire circumferential area of the seal 11, and thus waterproofness provided by the seal 11 can be stabilized over the entire circumferential area.

Figure 5A:
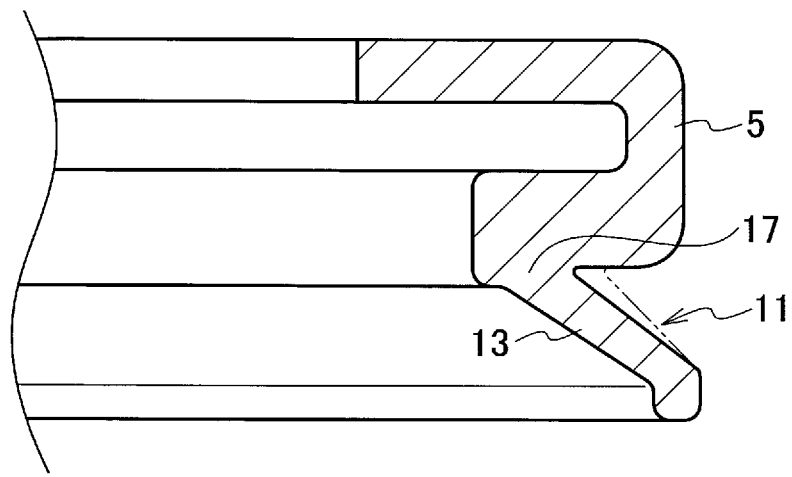
FIG. 5A is a cross-sectional view of a seal on the straight portion side of the grommet in another example according to the embodiment of the present invention.
Figure 5B:
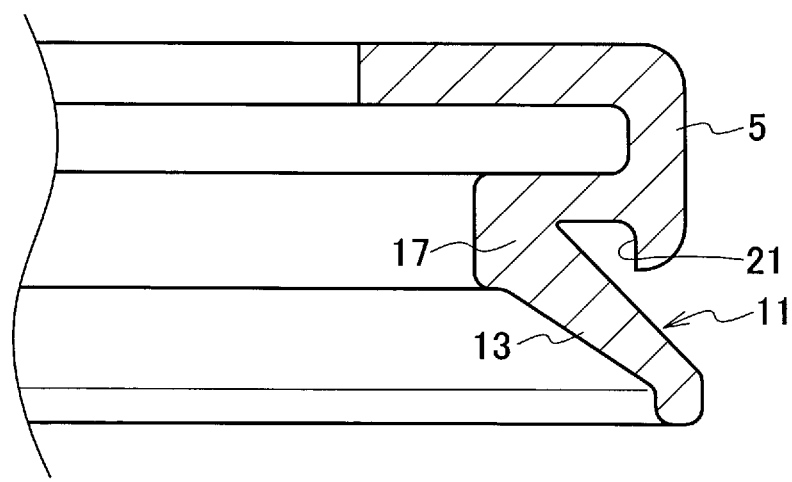
FIG. 5B is a cross-sectional view of a seal on the straight portion side of the grommet in another example according to the embodiment of the present invention.

The seal 11 may be defined such that the arc portion 7 side is conventionally defined and the thickness of the base 17 on the straight portion 5 side is reduced as illustrated in FIG. 5A. Alternatively, the base 17 on the straight portion 5 side may be provided, for example, with a cut-away portion 21 to increase the length of the deformable portion 13, as illustrated in FIG. 5B.

In such a grommet 1, the seal 11 is defined such that its rigidity gradually increases from the side of the pair of straight portions 5, 5 toward the side of the pair of arc portions 7, 7. Therefore, when the seal 11 is in sealing contact with the surface of the mounting member 3, the elastic deformation of the straight portion 5 side of the seal 11 toward the arc portion 7 side of the seal 11 can be reduced in the grommet 1.

Accordingly, for such a grommet 1, the straight portion 5 side of the seal 11 and the arc portion 7 side of the seal 11 can be uniformly and elastically deformed in the elliptically shaped seal 11, and thus waterproofness provided by the seal 11 can be stabilized over the entire circumferential area.

Since the thickness on the body 9 side of the seal 11 gradually increases from the side of the pair of straight portions 5, 5 toward the side of the pair of arc portions 7, 7, the arc portion 7 side of the seal 11 is less susceptible to elastic deformation compared to the straight portion 5 side. Therefore, the elastic deformation of the straight portion 5 side of the seal 11 toward the arc portion 7 side can be reduced.

Additionally, in such a grommet 1, the degree of sealing over the entire circumferential area of the seal 11 against the surface of the mounting member 3 can be controlled by setting the thickness on the body 9 side of the seal 11.

Furthermore, the deformable portion 13 of the seal 11, which elastically deforms when in sealing contact with the surface of the mounting member 3, is gradually shortened from the side of the pair of straight portions 5, 5 toward the side of the pair of arc portions 7, 7. In this manner, the amount of deformation in the deformable portion 13 on the arc portion 7 side of the seal 11 is less than that on the straight portion 5 side, and the elastic deformation of the deformable portion 13 on the straight portion 5 side of the seal 11 toward the arc portion 7 side can be reduced.

Additionally, in such a grommet 1, the degree of sealing over the entire circumferential area of the seal 11 against the surface of the mounting member 3 can be controlled by setting the length of the deformable portion 13 of the seal 11.

While both the thickness on the body side of the seal and the length of the deformable portion of the seal are set on the straight portion side and the arc portion side in the grommet according to the embodiment of the present invention, the present invention is not limited thereto. Either the thickness on the body side of the seal or the length of the deformable portion of the seal, but not both, may be set.

Although preferred embodiments of the present invention have been described above, it should be appreciated that these embodiments are mere examples to facilitate understanding of the present invention and the present invention can be modified in various ways within the scope of the invention without being limited to the above embodiments.

What is claimed is:

1. A grommet comprising:
a body with an annular shape having a pair of opposing straight portions and a pair of arc portions connecting both ends of the pair of straight portions, and the body configured to mount to a mounting member; and
a seal formed continuously on the outer peripheral side of the body circumferentially and to be elastically deformable and is configured to be in sealing contact with a surface of the mounting member, wherein
rigidity of the seal increases gradually from a side of the pair of straight portions toward a side of the pair of arc portions.

2. The grommet according to claim 1, wherein
a thickness on a body side of the seal increases gradually from the side of the pair of straight portions toward the side of the pair of arc portions.

3. The grommet according to claim 2, wherein
the body side of the seal is thicker, at the side of the pair of arc portions than at the side of the pair of straight portions, in a direction perpendicular to a circumferential direction of the seal in which the seal extends.

4. The grommet according to claim 1, wherein
a deformable portion of the seal is configured to deform elastically when in sealing contact with the surface of the mounting member, and the deformable portion is gradually shortened from the side of the pair of straight portions toward the side of the pair of arc portions.

5. The grommet according to claim 4, wherein
the deformable portion is shorter, at the side of the pair of arc portions than at the side of the pair of straight portions, in a direction perpendicular to a circumferential direction of the seal in which the seal extends.

6. The grommet according to claim 1, wherein
the rigidity of the seal increases gradually from the side of the pair of straight portions toward the side of the pair of arc portions along a circumferential direction of the seal.

* * * * *